United States Patent [19]

Hager et al.

[11] Patent Number: 4,917,331
[45] Date of Patent: Apr. 17, 1990

[54] APPARATUS AND METHODS FOR REDUCING AIRCRAFT LIFTING SURFACE FLUTTER

[75] Inventors: Thomas R. Hager, Bothell; Gerald C. Lakin, Bellevue; John T. Rogers, Snohomish, all of Wash.

[73] Assignee: The Boeing Company, Seattle, Wash.

[21] Appl. No.: 269,839

[22] Filed: Nov. 10, 1988

[51] Int. Cl.$^4$ .............................................. B64D 27/00
[52] U.S. Cl. ...................................... 244/54; 244/75 A
[58] Field of Search ................ 244/55, 54, 75 A, 130, 244/213, 215, 216, 137.4

[56] References Cited

U.S. PATENT DOCUMENTS

| | | | |
|---|---|---|---|
| 1,867,708 | 7/1932 | Paton | 244/75 A |
| 1,896,270 | 2/1933 | Wright | 244/55 |
| 1,990,978 | 2/1935 | Child | 244/75 A |
| 2,061,242 | 11/1936 | Loening | 244/130 |
| 2,081,957 | 6/1937 | Roche | 244/75 A |
| 2,090,775 | 8/1937 | Wright | 244/130 |
| 2,124,098 | 7/1938 | Younger | 244/75 A |
| 2,332,516 | 10/1943 | Kemmer | 244/75 A |
| 2,398,704 | 4/1936 | Gassner | 244/54 |
| 3,327,965 | 6/1967 | Bockrath | 244/54 |
| 3,734,432 | 5/1973 | Low | 244/75 A |
| 4,233,883 | 11/1980 | Miko | 244/137.4 |
| 4,343,447 | 8/1982 | Reed, III | 244/130 |
| 4,502,652 | 3/1985 | Breitbach | 244/75 A |
| 4,560,122 | 12/1985 | Parkinson et al. | 244/54 |
| 4,562,546 | 12/1985 | Wykes et al. | 244/75 A |
| 4,616,793 | 10/1986 | Hassler, Jr. | 244/137.4 |

FOREIGN PATENT DOCUMENTS

217119 2/1942 Switzerland ........................ 244/54

Primary Examiner—Joseph F. Peters, Jr.
Assistant Examiner—Anne Sartelle
Attorney, Agent, or Firm—Robert H. Sproule; B. A. Donahue

[57] ABSTRACT

A device for preventing aircraft wing flutter causes the port and starboard wings of the aircraft to oscillate at different frequencies. In an exemplary embodiment, engine nacelles are suspended from the port and starboard wings by strut assemblies in a manner that the port and starboard engine nacelles have different oscillation frequencies when subjected to a displacing force. The port and starboard strut assemblies each include a pair of flexible beams whose dimensions and composition may be adjusted to change its stiffness. In this manner, the oscillation frequency of the attached engine nacelle is adjusted in a known manner.

11 Claims, 6 Drawing Sheets

APPARATUS AND METHODS FOR REDUCING AIRCRAFT LIFTING SURFACE FLUTTER

TECHNICAL FIELD

The present invention pertains to apparatus and methods for reducing aircraft lifting surface flutter by causing port and starboard lifting surfaces to oscillate at different natural frequencies. More particularly, the present invention pertains to apparatus and methods for reducing wing flutter by attaching wing components, such as engine nacelles, to port and starboard wings in a manner that when subjected to a time-varying exciting force, the port wing and its attached nacelles oscillate at a different natural frequency than the starboard wing and its attached nacelles.

BACKGROUND OF THE INVENTION

It is a design goal that when an aircraft wing is subjected to a momentary force in flight which causes the wing to oscillate between a bended state and an unbended state, that in the absence of this force, the oscillations will damp out and the wing will return to a steady, unbended state. On the other hand, "wing flutter" refers to a phenomenon in which the wing oscillations between the bended state and the unbended state do not damp out. Rather, the amplitude of these oscillations either remains constant or increases over time.

Wing flutter is an aeroelastic instability produced by the coalescing and proper phasing of two or more structural vibration modes of an aircraft in flight. A flutter mode usually involves both bending and torsion types of motion in which the torsional motion extracts energy from the airstream and drives the bending mode to increasingly higher amplitudes. In other cases these oscillations are lightly damped, but stable, within the operating speed envelope of the aircraft and can cause a reduction in the riding comfort of the aircraft.

The location of the engine nacelle relative to the wing, the mass properties of the engine, and the stiffness of the strut which attaches the nacelle to the wing are factors which influence the flutter characteristics of the wing. More specifically, the natural frequency of the nacelle and the manner of strut installation can influence the mode and airspeed at which the wing oscillations become unstable (flutter).

Conventionally, in order to avoid wing flutter, the natural frequency of the nacelles and nacelle struts are restricted within a narrow range. For example, in earlier models of the Boeing 747 aircraft, the outboard engine nacelles are permitted to oscillate at a natural frequency of about two cycles per second in a lateral direction. If the outboard engine nacelle lateral frequencies are significantly above or below two cycles per second then wing flutter can result at an unacceptably low airspeed.

However, in some newer aircraft which feature stronger but less stiff lifting surfaces, flutter can occur at airspeeds below that required by government regulations. In this case, the avoidance of wing flutter requires the unsatisfactory solution of reducing the maximum operating speed of the aircraft.

Other methods have been disclosed for preventing wing flutter, such as by adding damping materials, or by changing the relative positions of a component mass and/or center of pressure. For example, U.S. Pat. No. 2,124,098 by Younger pertains to an airfoil flutter damping device which includes an auxiliary airfoil device which attaches to a main airfoil to counteract flutter forces in the main airfoil.

Furthermore, U.S. Pat. No. 3,327,965 by Bockrath discusses a damping device which dissipates the oscillatory energy transmitted from an aircraft wing to an attached engine nacelle in order to prevent undesirable motion of the engine nacelle.

Other systems for preventing wing flutter include U.S. Pat. No. 3,734,432 by Low which pertains to a system for using leading and trailing edge control surfaces under the control of a stability augmentation system to damp out wing flutter.

A pneumatic spring system for suspending a store from a wing in order to reduce wing flutter is disclosed in U.S. Pat. No. 4,343,447 by Reed III.

And, U.S. Pat. No. 4,502,652 by Breitbach pertains to a spring device for suppressing wing flutter when carrying external loads.

SUMMARY OF THE INVENTION

The present invention pertains to methods and apparatus for preventing wing flutter in an aircraft having left and right lifting surfaces, such as wings. The method includes the steps of providing a first element, such as an engine nacelle and strut, of the left wing and a second element, such as another engine nacelle and strut, of the right wing, which have different lateral natural frequencies. The difference in lateral natural frequencies is sufficient so that when subjected to a time-varying disturbance in flight, the flutter speed of the aircraft is increased.

DESCRIPTION OF THE DRAWINGS

The present invention will be described in greater detail by referring to the following detailed description in conjunction with the attached drawings, in which.

DETAILED DESCRIPTION OF THE INVENTION

The present invention pertains to apparatus and methods for preventing flutter in a lifting surface such as an aircraft wing, by causing the port and starboard wings of an aircraft to oscillate at different frequencies. As will be explained in the following detailed description, the wing may have a suspended mass, such as for example, an engine or external store. In an exemplary embodiment, the invention will be described with regard to the attachment of one or more engine nacelles to both the port and starboard wings of an aircraft in a manner to reduce wing flutter. However it should be appreciated that the scope of the present invention is not limited to this embodiment.

By the way of further background, it should be added that airplanes are designed to perform a certain mission within a maximum operating speed envelope at a reasonable cost to the operator. To provide a margin beyond the maximum operational speed in the event of an upset maneuver, the aircraft structure must remain intact up to a higher design drive speed ($V_D$). The federal government requires that the lowest airplane flutter speed be at least twenty percent higher than $V_D$, i.e. $1.2 V_D$.

Early airplanes were flown at slow speeds with wings that were usually over designed, resulting in large flutter margins. As speeds increased and wing designs became less conservative, flutter margins decreased. Material strength allowables became greater and wing structural gages were reduced to save weight. However, the smaller gages reduced wing stiffness and made them more flexible. Flutter speeds, which are generally proportional to wing stiffness, decreased and in many instances an insufficient margin over $V_D$ was predicted for wings meeting all aspects of strength design. In many of these cases, the gages had to be increased over and above that required for strength purposes to give an acceptable flutter speed margin. This gage increase sometimes produced a significant weight penalty which subtracted from the performance of the airplane. Recently, methods of optimizing the distribution of stiffness material, such as aeroelastic tailoring, have been used to minimize the penalty.

Other passive means to minimize the flutter penalty have been used and include changing the wing geometry such as aspect ratio, sweep, taper ratio, thickness ratio and dihedral. The location for placing engines and other stores on the wing is often carefully selected to favor higher flutter speeds. However, these design choices may result in compromising the airplane performance.

Figure 1:
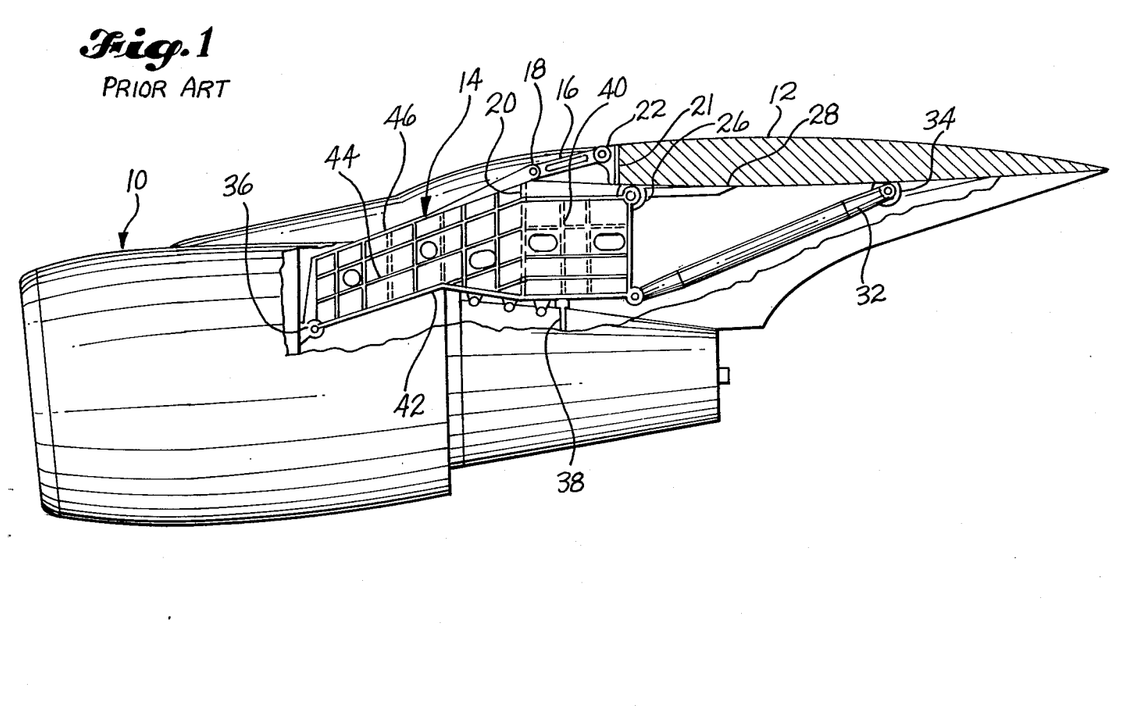
FIG. 1 is a side view showing a conventional strut for attaching an engine nacelle to an aircraft wing.
Figure 2:
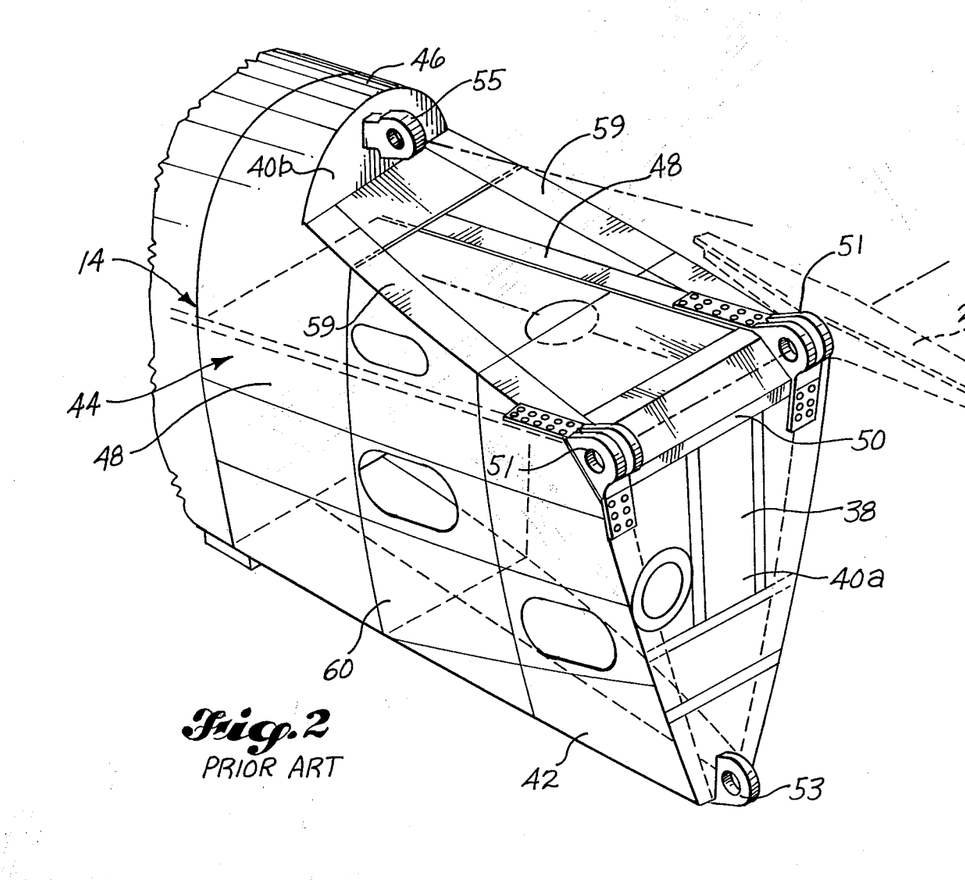
FIG. 2 is a partial isometric view of a portion of the conventional strut shown in FIG. 1.

Referring first to FIG. 1, there is shown a conventional method of attaching an engine nacelle indicated at 10 to a wing 12 by means of a conventional strut assembly indicated at 14. As shown in FIG. 2, the strut assembly 14 has a somewhat trapezoidal cross-sectional configuration. The strut 14 (FIG. 1) is connected to the wing 12 by a rearward extending upper linking rod 16 which has a forward end connected by a connector 18 to an upper portion 20 of the strut, and a rear end connected by a connector 22 to a spar 21 of the wing. To further connect the strut 14 to the wing there are provided a pair of connectors 26 (only one of which is shown in FIG. 1) which are located at the upper rear end of the strut and which attach to a fitting 28 of the wing. In addition, the lower rear end of the strut 14 is attached to the wing by a connector 30 which is attached to an upward and rearward extending brace 32; the other end of brace 32 being attached to a wing fitting 34. Furthermore, the engine nacelle 10 is connected to the strut 14 in a conventional manner by means of a forward mount 36 and an aft mount 38.

The strut 14 (FIG. 1) is formed by a number of vertical, spanwise bulkheads 40 which are joined at their lower ends by a fore and aft extending lower spar 42, at their midsections by a midspar 44, and at their upper ends by an upper spar 46. A number of the rear bulkheads 40 are shorter in height than the forward bulkheads. These shorter bulkheads include a rearmost bulkhead 40a, while the taller forward bulkheads include a rearmost bulkhead 40b.

Referring now to FIG. 2, a portion of the conventional strut 14 is shown extending from just forward of the bulkhead 40b in a rearward direction and terminating at the bulkhead 40a. In this manner there is shown the portion of the strut 14 which is connected to the wing 12. The midspar 44 is formed by a pair of fore and aft extending beams 48 which are joined together at the bulkhead 40a by a crossbeam 50. Attached to the aft end of each beam 48 at the crossbeam 50 is a female portion 51 of the connector 26 which is attached to a male portion (not shown) of the connector which in turn is mounted to the wing. The male and female connector portions are held together by a lateral pin (not shown) which extends through openings in the male and female portions.

In order to connect the strut 14 to the brace 32 (FIGS. 1 and 2), a male portion 53 of the connector 30 is mounted to the aft end of the lower spar 42. In addition, a male portion 55 of the upper fitting 22 is attached to the aft end of the upper spar 46 to further secure the strut to the wing. The strut is further formed by a closure spar which includes a pair of beams 59 which extend downward and rearward from the bulkhead 40b and which are connected to the aft end of the midspar 44. A fairing skin 60 encloses the strut to reduce aerodynamic drag.

Figure 3A:
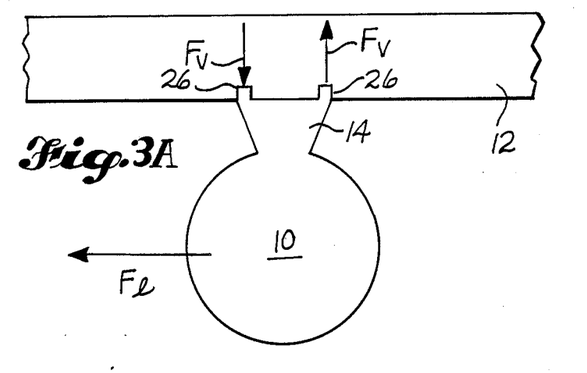
FIGS. 3A and 3B are simplified diagrams showing the reaction forces ($F_y$) generated in the conventional strut when the nacelle is subjected to a lateral force.
Figure 3B:
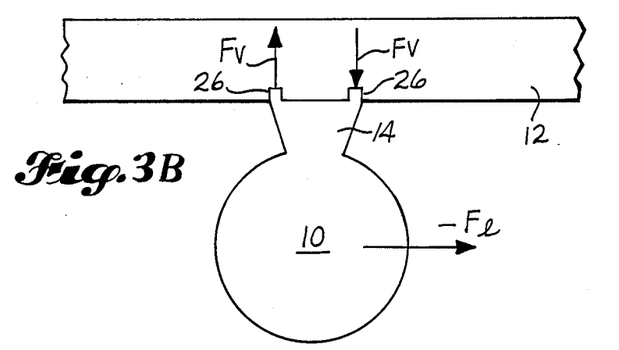

Having described a conventional strut for attaching a nacelle to a wing, attention now will be turned to the load forces generated in response to lateral (side-to-side) movement of the engine nacelle. Referring now to FIG. 3 there is shown a simplified diagram of the wing 12 which supports the engine nacelle 10 by means of the conventional strut 14 at the connectors 26. When a lateral force $F_L$ is applied to the nacelle 10, vertical forces $F_v$ and $-F_v$ are generated through the connectors 26 and the strut 14 to form a couple. Similarly, when a lateral force $-F_L$ (FIG. 3B) acts on the nacelle in the opposite direction, vertical forces $-F_v$ and $F_v$ react through the connectors 26 to the wing. In this manner an oscillatory force on the nacelle is transmitted into the wing.

Figure 4:
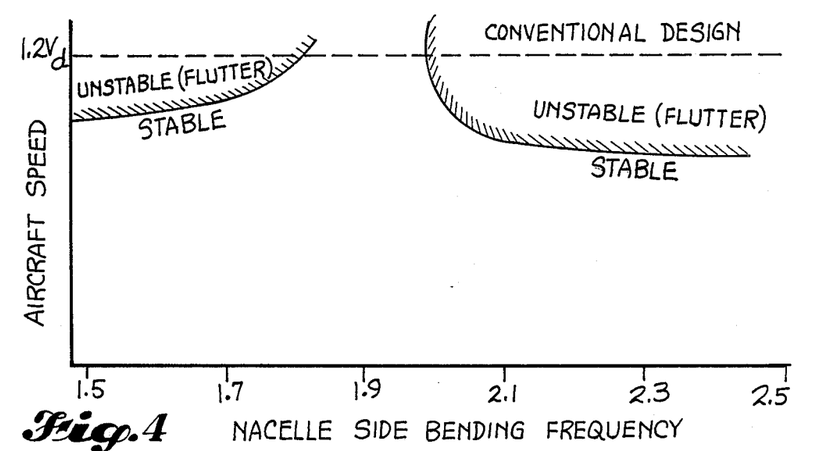
FIG. 4 is a graph which shows a boundary between flutter (unstable) and nonflutter (stable) operation as a function of aircraft speed and nacelle side bending frequency for a conventional strut configuration.

The lateral natural frequency of oscillation of the nacelle is, in part, determined by the stiffness of the strut, which in turn is controlled by careful design of the strut structural components such as spars and bulkheads. The importance of the nacelle lateral frequency becomes apparent by reference to FIG. 4 which is a graph of flutter speed as function of nacelle lateral frequency for an aircraft in which all of the struts have the previously described conventional configuration. More specifically, the lateral frequency of a nacelle and strut on the port wing is configured to be identical to a similarly positioned nacelle and strut on the starboard wing (referred to as a "symmetrical design"). In accordance with federal regulations, a wing must have a flutter speed of at least 1.2 times the aircraft certified dive speed. As shown in the exemplary graph in FIG. 4, there is a window between about 1.8 and 2.0 cycles per second (Hz) of nacelle side bending frequency where the airspeed of the aircraft can reach 1.2 $V_d$ and still avoid wing flutter. In this case, the conventional strut described previously can be "tuned" so that the nacelle side bending frequency is located inside the window.

Figure 5:
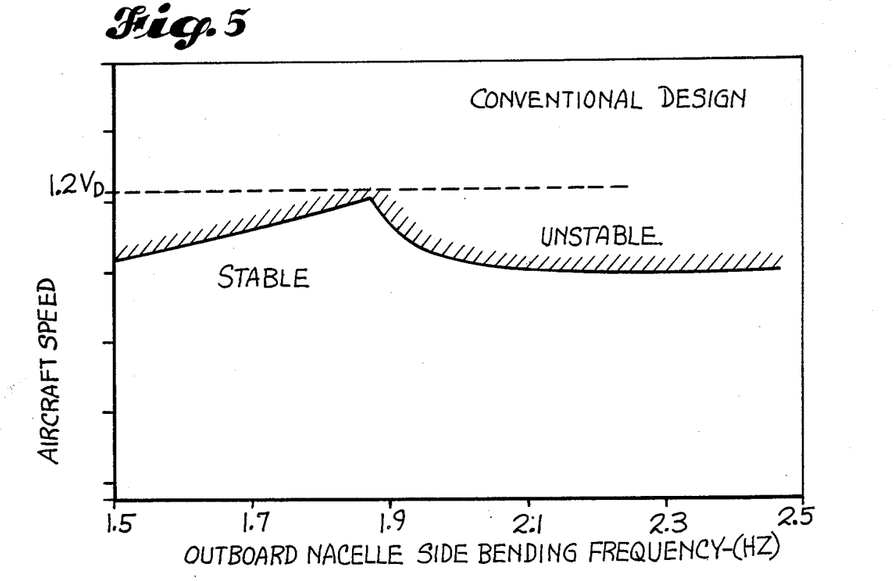
FIG. 5 is a graph, similar to the graph of FIG. 4, in which flutter occurs prior to reaching the maximum required operating speed of the aircraft for a conventional strut configuration.

In some engine nacelle configurations which use the conventional strut shown in FIGS. 1 and 2, this flutter window is essentially closed. As shown by the graph in FIG. 5, the onset of wing flutter occurs at airspeeds below 1.2$V_d$, with the highest airspeed obtainable being at a side bending frequency of slightly below 1.9 Hz. This conventional configuration would require that the maximum operating speed of the aircraft be reduced to avoid flutter. Alternatively the wing could be stiffened to raise the flutter speed above 1.2$V_d$. The additional stiffness material, however, would add a weight penalty to the aircraft.

The strut design of the present invention overcomes this problem without a speed reduction or the weight penalty of additional wing stiffening. It has been found that when the nacelle attachment struts are configured so that a nacelle on the port wing has a side bending frequency that is different from the side bending frequency of a nacelle on the starboard wing (the nacelles being located in the same relative positions on opposite wings, e.g. starboard outboard position and port outboard position), that flutter is eliminated or at least postponed until significantly higher airspeeds. This concept of providing port and starboard struts which allow the nacelles at opposite sides of the fuselage to have different side bending frequencies (asymmetrical strut design) is quite different from the conventional manner of attaching the nacelles so that the left and right struts are tuned to a common side bending frequency. More broadly, the present invention operates to eliminate wing flutter by configuring the aircraft so that the port and starboard wings oscillate at different natural frequencies.

Figure 6:
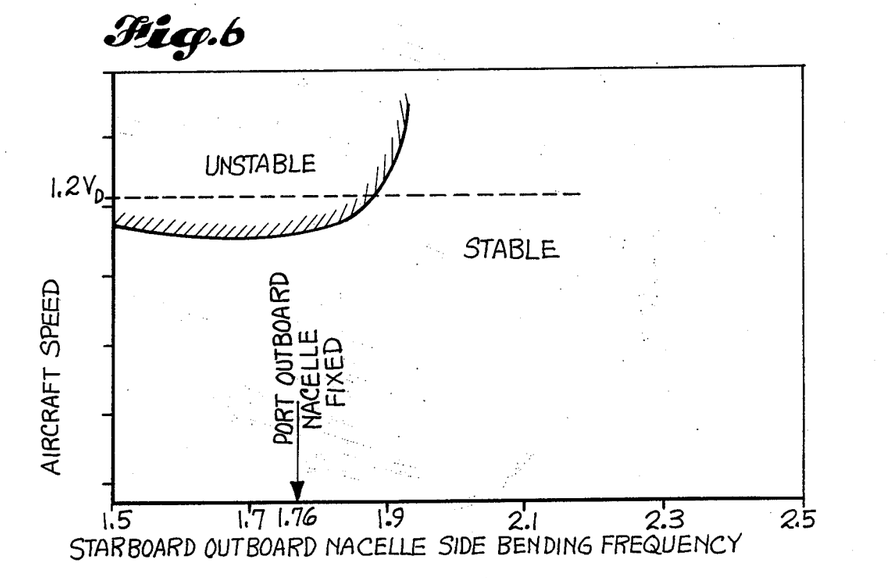
FIG. 6 is a graph, similar to that of FIG. 4, for an aircraft which incorporates the apparatus and method of the present invention.

This concept is reflected by the graph of FIG. 6 in which the port outboard nacelle on a four engine aircraft was made to oscillate at a natural frequency of 1.76 Hz, and the starboard outboard nacelle was adjusted over an experimental range of several different side bending frequencies. As shown by FIG. 6, when the starboard outboard nacelle had a side bending frequency of at least 1.9 Hz, the onset of flutter occurs at airspeeds exceeding 1.2 $V_D$.

Figure 7:
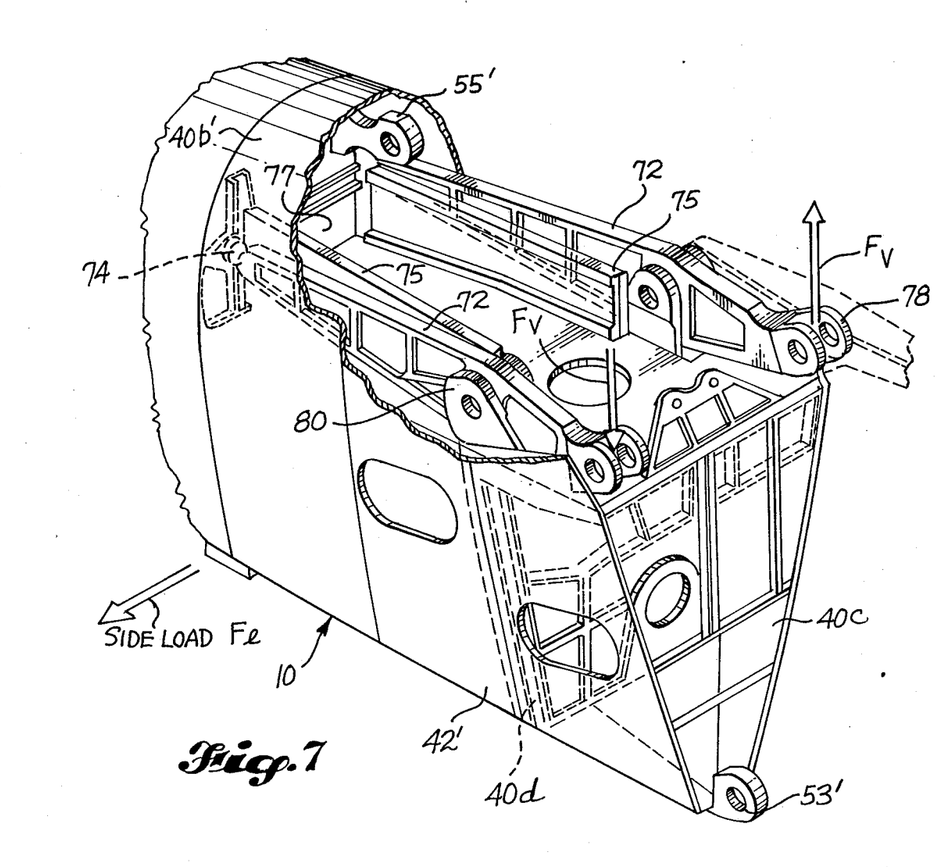
FIG. 7 is a partial isometric view of the nacelle attachment strut of an exemplary embodiment of the present invention.

In order to achieve an asymmetrical strut design there is provided an attachment strut shown in FIG. 7, in which elements common to the conventional strut described with reference to FIGS. 1 and 2, will be identified by common numerals with a prime (') suffix attached. There is shown in FIG. 7 a portion of a strut indicated at 70 for attaching an engine nacelle to a wing. This portion of the strut extends rearward from bulkhead 40b' and terminates at a rear bulkhead 40c. This design provides a pair of parallel spring beams 72 in place of the connectors 26 in FIG. 1 to connect the strut to the wing. More specifically, each spring beam 72 extends in a fore and aft direction so that a forward end 74 of each spring beam is fastened to the bulkhead 40b'. The midspar of FIG. 1 is formed by left, right parallel beams 75 which extend rearward from the bulkhead 40b'. Located outboard of each beam 75 is one of the spring beams 72. At the rear end of each spring beam 72 is a female portion of a connector 78 which is attached to the wing in a conventional manner.

In this invention, the natural side bending frequencies of the nacelles on the left and right wings are different. The different side bending frequencies are achieved by spring beams 72 of different stiffnesses in the left and right nacelle struts. In an exemplary embodiment the spring beam 72 (FIG. 8) in the right outboard nacelle strut of a Boeing 747 aircraft has a larger cross sectional height dimension h than the cross sectional height dimension h' of the spring beam 72' (FIG. 9) in the port outboard nacelle strut. Here the primed numbers refer to starboard spring beam components and the unprimed numbers refer to port components. In this manner the starboard outboard nacelle strut is stiffer than the port outboard nacelle strut. It is this difference in vertical flexibility along the respective lengthwise axes of the spring beams of the port and starboard nacelle struts which is a unique feature of the present invention.

Figure 8:
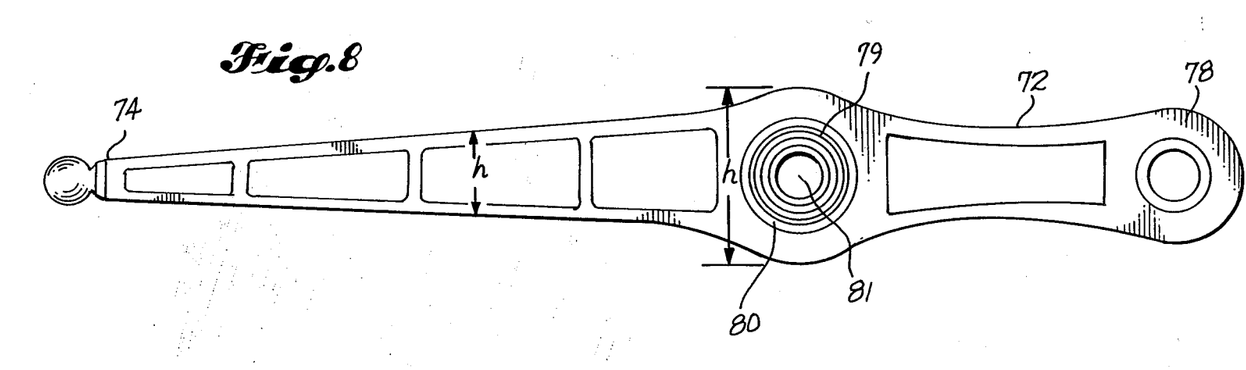
FIG. 8 is a side view of a spring beam member having a first cross sectional height dimension.
Figure 9:
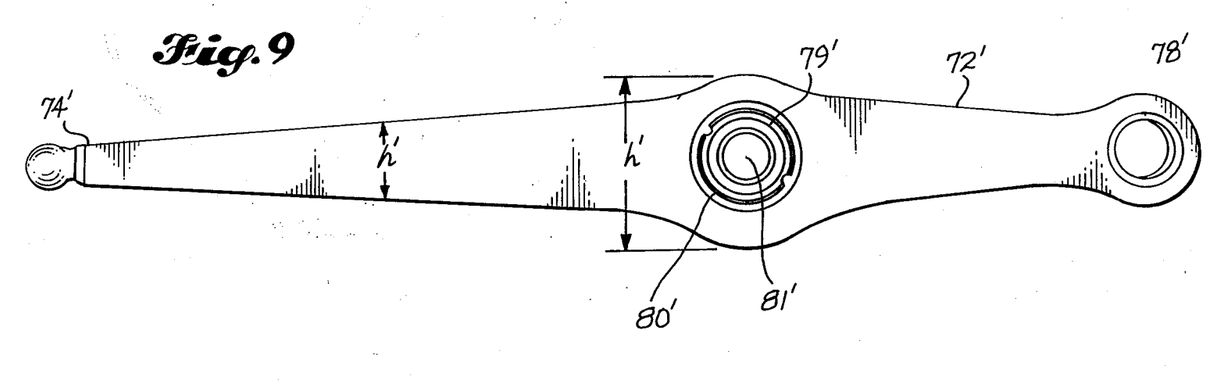
FIG. 9 is a side view of another spring beam member having a second cross sectional height dimension which is less than the first cross sectional height dimension.

Referring now to FIGS. 7 through 9, there is located between the forward and aft ends of each spring beam 72 a rotary bearing 79. The rotary bearing 79 is supported in a trunnion 80 by a pin (not shown) which extends through sideholes in the trunnion and through a central opening 81 in the bearing 79. Left, right trunnions 80 are attached to the aft ends of the beams 75 which form the midspar. In this manner a portion of each spring beam extending between the bearing 79 and the connector 78 is cantilevered, with the cantilevered portion permitted to rotate slightly in the bearing 79. Support for each trunnion 80 is provided by a bulkhead 40d. The bulkhead 40d is attached to the lower spar 42' at its lower end, and to the bottom of each trunnion 80 at its upper end. The upper end of the bulkhead 40d is also attached to the rear ends of the midspar beams 75.

In the present invention, a lateral force $F_L$ (FIG. 7) exerted against the engine nacelle generates similar force components $F_v$, $-F_v$ described with reference to FIGS. 3A and 3B. These forces act in opposite vertical directions to cause up and down movement of the cantilevered portions of the spring beams. Thus by controlling the flexibility of the spring beams, it is possible to control the natural frequency of oscillation of the engine nacelle. More specifically, by controlling the vertical and/or thickness dimensions of the spring beam as well its material composition, the precise stiffness of the beam is controlled in a known manner. In turn, the side bending frequency of the engine nacelle is a function of the stiffness of the spring beam.

In an exemplary embodiment of the present invention, the conventional struts 14 shown in FIGS. 1 and 2 are used to attach the inboard engine nacelles to the port and starboard wings of a Boeing 747 aircraft, while the struts 70 of the present invention are used to attach the outboard engine nacelles to the port and starboard wings. While the inboard struts are tuned so that the nacelle side bending frequency of each is the same, the port outboard strut is adjusted so that the nacelle has a side bending frequency of 1.76Hz, while the opposite outboard strut is adjusted so that the nacelle side bending frequency is 2.11 Hz. In this configuration during wind tunnel tests, wing flutter was avoided to speeds above 1.2 $V_d$. Although not wishing to be bound by theory, it is speculated that the difference in oscillation frequencies between the port and starboard wings resulted in a mutual suppression of the wing flutter.

What is claimed is:

1. An aircraft having a fuselage, the aircraft comprising:

a. a first wing and a second wing which are attached to opposite sides of the fuselage;
b. a first engine and a second engine; and
c. a first strut for attaching the first engine to the first wing and a second strut for attaching the second engine to the second wing in a manner that when the first engine and the second engine are subjected to a force, the first engine is caused to oscillate at a different frequency than the second engine, the first strut further including means for transmitting the oscillations of the first engine to the first wing, and means for transmitting the oscillations of the second engine to the second wing in a manner that the first wing oscillates at a different frequency than the second wing so as to reduce flutter.

2. The aircraft as set forth in claim 1 wherein:
a. the first strut includes a first attaching member which is located between the first engine and the first wing;
b. the second strut includes a second attaching member which is located between the second engine and the second wing; and
c. the first strut is different from the second strut member in a manner that when the first and second engines are subjected to the force, the first engine oscillates at a different frequency than the second engine.

3. The aircraft as set forth in claim 2 wherein:
a. the first strut includes first beam means which are located between the first engine and the first wing;
b. the second strut includes second beam means which are located between the second engine and the second wing; and
c. the first beam means is different from the second beam means in a manner that when the first and second engines are subjected to the force, the first engine oscillates at a different frequency than the second engine.

4. The aircraft as set forth in claim 3 wherein the first beams means has a different flexibility than the second beam means so that the first engine oscillates at a different frequency than the second engine when subjected to the force.

5. The aircraft as set forth in claim 4 wherein the first beams means has a different cross sectional dimension than the second beam means so that the first and second struts have different flexibilities.

6. The aircraft as set forth in claim 1 wherein:
a. the first strut includes first means for suspending the first engine from the first wing;
b. the second strut includes second means for suspending the second engine from the second wing; and
c. the first suspending means is different from the second suspending means in a manner that when the first engine and the second engine are subjected to the force, the first engine oscillates at a different frequency than the second engine.

7. A method of reducing flutter in an aircraft, the method comprising the steps of:

a. providing an aircraft having a fuselage and first and second wings which are attached to different locations of the fuselage;
b. providing a first engine and a second engine;
c. attaching the first engine to the first wing and the second engine to the second wing in a manner that (i) when the first and second engines are subjected to a force, the first engine oscillates at a different frequencys than the second engine, and (ii) the oscillations of the first engine are transmitted to the first wing and the oscillations of the second engine are transmitted to the second wing; and
d. oscillating the first wing at a different frequency than the second wing in response to the oscillations transmitted from the first engine and the second engine.

8. The method as set forth in claim 7 wherein:
a. the first engine is attached to the first wing by a first strut;
b. the second engine is attached to the second wing by a second strut; and
c. the first strut is different from the second strut in a manner that the first engine oscillates at a different frequency than the second engine when subjected to the force.

9. The method as set forth in claim 8 wherein:
a. the first strut includes first beam means;
b. the second strut includes second beam means; and
c. the first beam means has a different flexibility than the second beam means so that the first engine oscillates at a different frequency than the second engine when subjected to the force.

10. The aircraft as set forth in claim 7 wherein:
a. the first strut has a first cross sectional dimension; and
b. the second strut has a second cross sectional dimension which is different from the first cross sectional dimension so that the first strut has a different flexibility than the second strut.

11. The aircraft as set forth in claim 8 wherein:
a. the first strut includes:
 (1) frame means,
 (2) first elongate means having a first end which is attached to the frame means, and a second end which is attached to the first wing,
 (3) means for connecting the first elongate means to the frame means between the first end and the second end so that the second end is suspended in a cantilevered manner,
 (4) second elongate means having a first end which is attached to the frame means and a second end which is attached to the first wing,
 (5) means for connecting the second elongate means to the frame means between the first end and the second end of the second elongate means so that the second end is suspended in a cantilevered manner; and
b. when the first wing is subjected to a lateral force, the cantilevered second end of the first elongate means and the cantilevered second end of the second elongate means are caused to move in opposing vertical directions.

* * * * *